(12) United States Patent
Miyamae et al.

(10) Patent No.: US 10,442,517 B2
(45) Date of Patent: Oct. 15, 2019

(54) MARINE REDUCTION GEAR

(71) Applicant: KAWASAKI JUKOGYO KABUSHIKI KAISHA, Kobe-shi, Hyogo (JP)

(72) Inventors: Ryo Miyamae, Kobe (JP); Shoichi Takahashi, Kobe (JP); Tatsuya Ohno, Nishinomiya (JP); Yoshihiko Ozaki, Kobe (JP); Kenichi Masamoto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/770,283

(22) PCT Filed: Oct. 20, 2016

(86) PCT No.: PCT/JP2016/081110
§ 371 (c)(1),
(2) Date: Apr. 23, 2018

(87) PCT Pub. No.: WO2017/069197
PCT Pub. Date: Apr. 27, 2017

(65) Prior Publication Data
US 2018/0312236 A1     Nov. 1, 2018

(30) Foreign Application Priority Data

Oct. 23, 2015  (JP) .................................. 2015-208889

(51) Int. Cl.
*B63H 21/20*    (2006.01)
*B63H 23/12*    (2006.01)
(Continued)

(52) U.S. Cl.
CPC ............. *B63H 23/12* (2013.01); *B63H 21/17* (2013.01); *B63H 21/20* (2013.01); *B63H 21/38* (2013.01);
(Continued)

(58) Field of Classification Search
CPC ........ B63H 21/17; B63H 21/20; B63H 21/38; B63H 2021/17; B63H 2021/205;
(Continued)

(56) References Cited

U.S. PATENT DOCUMENTS

2004/0192123 A1   9/2004  Mori et al.
2014/0072460 A1*  3/2014  Rohden ................ B63H 21/383
                                                        417/371

FOREIGN PATENT DOCUMENTS

EP    2 604 506 A1    6/2013
JP    S62-128997 U    8/1987
(Continued)

*Primary Examiner* — Daniel V Venne
(74) *Attorney, Agent, or Firm* — Oliff PLC

(57) ABSTRACT

A marine reduction gear makes it possible to reduce the installation space of an electrical rotating machine. A marine reduction gear includes: an input shaft coupled to an output shaft of an engine; an output shaft coupled to a propeller shaft that rotates a screw propeller; a gearbox accommodating an input gear provided on the input shaft and an output gear provided on the output shaft, the gearbox supporting a first bearing that supports the output shaft in a rotatable manner; and an electrical rotating machine including: a central shaft that rotates together with the output shaft; a rotor fixed to the central shaft; and a stator surrounding the rotor. The gearbox supports the stator and a second bearing that supports the central shaft of the electrical rotating machine in a rotatable manner.

7 Claims, 3 Drawing Sheets

(51) Int. Cl.
  *B63J 3/02* (2006.01)
  *F16H 1/06* (2006.01)
  *F16H 57/04* (2010.01)
  *B63H 21/17* (2006.01)
  *B63H 21/38* (2006.01)
  *H02K 7/116* (2006.01)

(52) U.S. Cl.
  CPC .............. *B63J 3/02* (2013.01); *F16H 1/06* (2013.01); *F16H 57/04* (2013.01); *F16H 57/0412* (2013.01); *F16H 57/0436* (2013.01); *B63H 2021/202* (2013.01); *B63H 2021/205* (2013.01); *B63H 2021/207* (2013.01); *H02K 7/116* (2013.01); *Y02T 70/5236* (2013.01)

(58) Field of Classification Search
  CPC .. B63H 2021/207; B63H 23/00; B63H 23/02; B63H 23/10; B63H 23/12; B63H 23/32; B63H 2023/00; B63H 2023/02; B63H 2023/32; F16H 1/06; F16H 57/0412; F16H 57/0436; B63J 3/02
  USPC .................................................. 440/3, 6, 75
  See application file for complete search history.

(56) References Cited

FOREIGN PATENT DOCUMENTS

| | | |
|---|---|---|
| JP | 2003-081185 A | 3/2003 |
| JP | 2010-012832 A | 1/2010 |
| JP | 2012-116234 A | 6/2012 |
| JP | 2014-509569 A | 4/2014 |

\* cited by examiner

MARINE REDUCTION GEAR

TECHNICAL FIELD

The present invention relates to a marine reduction gear.

BACKGROUND ART

There are cases where, in a ship, an electrical rotating machine is coupled to a reduction gear disposed between a propeller shaft and an engine that drives a screw propeller via the propeller shaft in order to, for example, generate electric power by utilizing excess output from the engine or assist the engine's output by utilizing electric power (see Patent Literature 1, for example).

CITATION LIST

Patent Literature

PTL 1: Japanese Laid-Open Utility Model Application Publication No. S62-128997

SUMMARY OF INVENTION

Technical Problem

However, generally speaking, the engine room of a ship is small and confined. For this reason, in the case of coupling an electrical rotating machine to the reduction gear, there is a problem in terms of the installation space of the electrical rotating machine.

In view of the above, an object of the present invention is to provide a marine reduction gear that makes it possible to reduce the installation space of the electrical rotating machine.

Solution to Problem

In order to solve the above-described problems, a marine reduction gear according to the present invention includes: an input shaft coupled to an output shaft of an engine; an output shaft coupled to a propeller shaft that rotates a screw propeller; a gearbox accommodating an input gear provided on the input shaft and an output gear provided on the output shaft, the gearbox supporting a first bearing that supports the output shaft in a rotatable manner; and an electrical rotating machine including: a central shaft that rotates together with the output shaft; a rotor fixed to the central shaft; and a stator surrounding the rotor. The gearbox supports the stator and a second bearing that supports the central shaft of the electrical rotating machine in a rotatable manner.

According to the above configuration, the electrical rotating machine is integrally incorporated in the gearbox. This makes it possible to reduce the installation space of the electrical rotating machine. In addition, since the gearbox doubles as the casing of the electrical rotating machine, the weight of the entire system including the gear reduction mechanism and the electrical rotating machine can be reduced.

The above marine reduction gear may further include a lubricating oil pump mounted to the gearbox and driven by the input shaft. The lubricating oil pump may circulate lubricating oil such that the lubricating oil flows downward in the gearbox, and supply the lubricating oil to the second bearing. The lubricating oil supplied to the second bearing may be ejected from the second bearing into the gearbox.

According to this configuration, the lubricating oil can be supplied to the bearing intended for the central shaft of the electrical rotating machine by utilizing the lubricating oil pump, which supplies the lubricating oil to the gears in the gearbox. In addition, the lubricating oil supplied to the bearing intended for the central shaft of the electrical rotating machine is ejected from the bearing into the gearbox. Thus, the bottom of the gearbox can be utilized as a lubricating oil receiver that is shared by the gears and the electrical rotating machine.

The above marine reduction gear may further include a coolant pump mounted to the gearbox and driven by the input shaft. The coolant pump may supply a coolant to the electrical rotating machine, such that the coolant flows in contact with the stator of the electrical rotating machine. According to this configuration, the electrical rotating machine can be made more compact than in a case where the electrical rotating machine is cooled by air applied thereto. Moreover, the coolant pump can be driven by using the output from the engine or from the electrical rotating machine, the output being distributed in the gearbox.

The coolant pump may supply the coolant to the electrical rotating machine through a first coolant supply line, and supply the coolant to a heat exchanger through a second coolant supply line. The heat exchanger may cool the lubricating oil by exchanging heat between the lubricating oil and the coolant, the lubricating oil being the lubricating oil that is to be sucked into the lubricating oil pump or the lubricating oil that has been discharged from the lubricating oil pump. According to this configuration, both the cooling of the electrical rotating machine and the cooling of the lubricating oil can be performed by using the single coolant pump.

Advantageous Effects of Invention

The present invention makes it possible to reduce the installation space of the electrical rotating machine.

DESCRIPTION OF EMBODIMENTS

Figure 1:
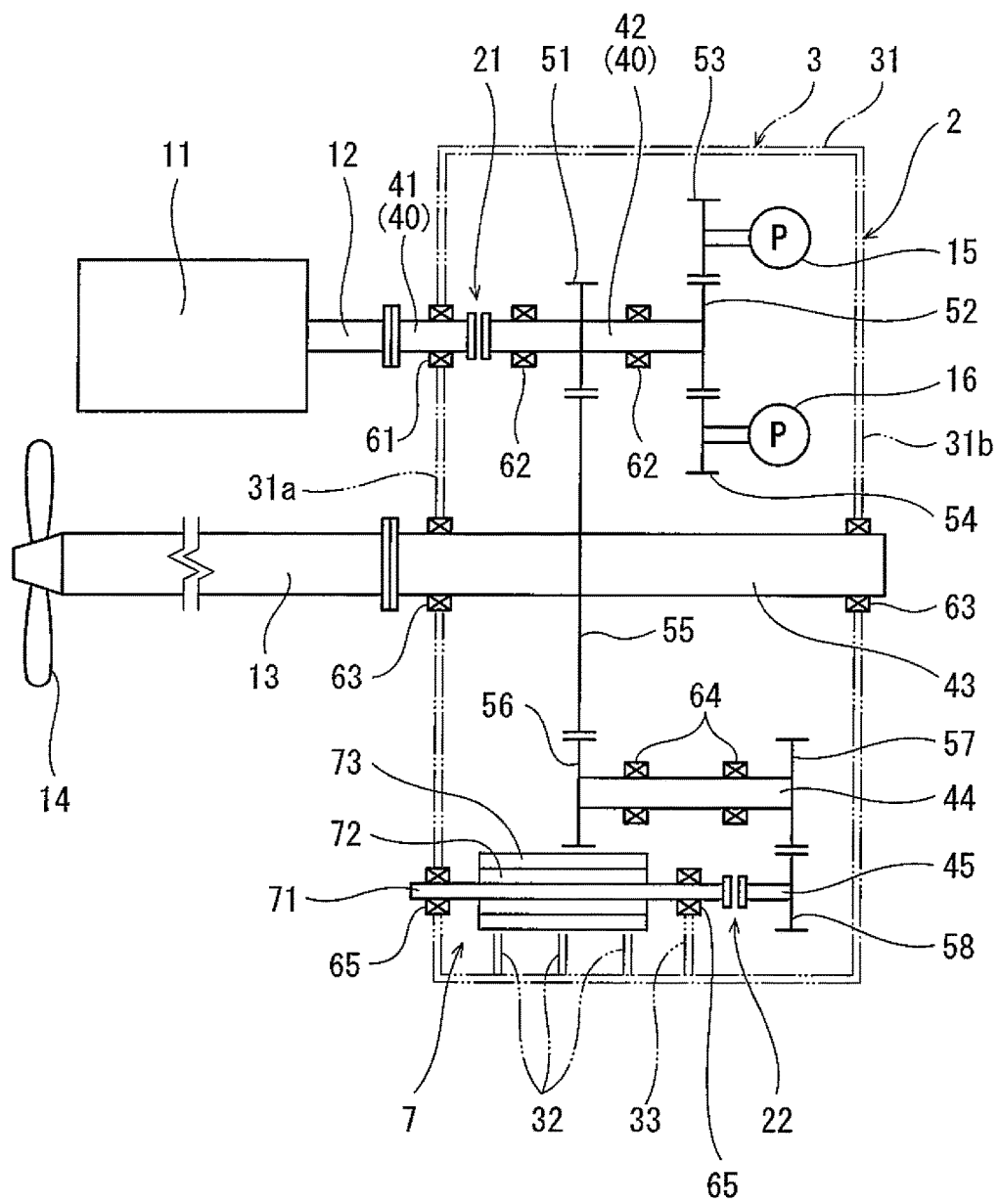
FIG. 1 is a plan view showing a schematic configuration of a marine reduction gear according to one embodiment of the present invention.
Figure 2:
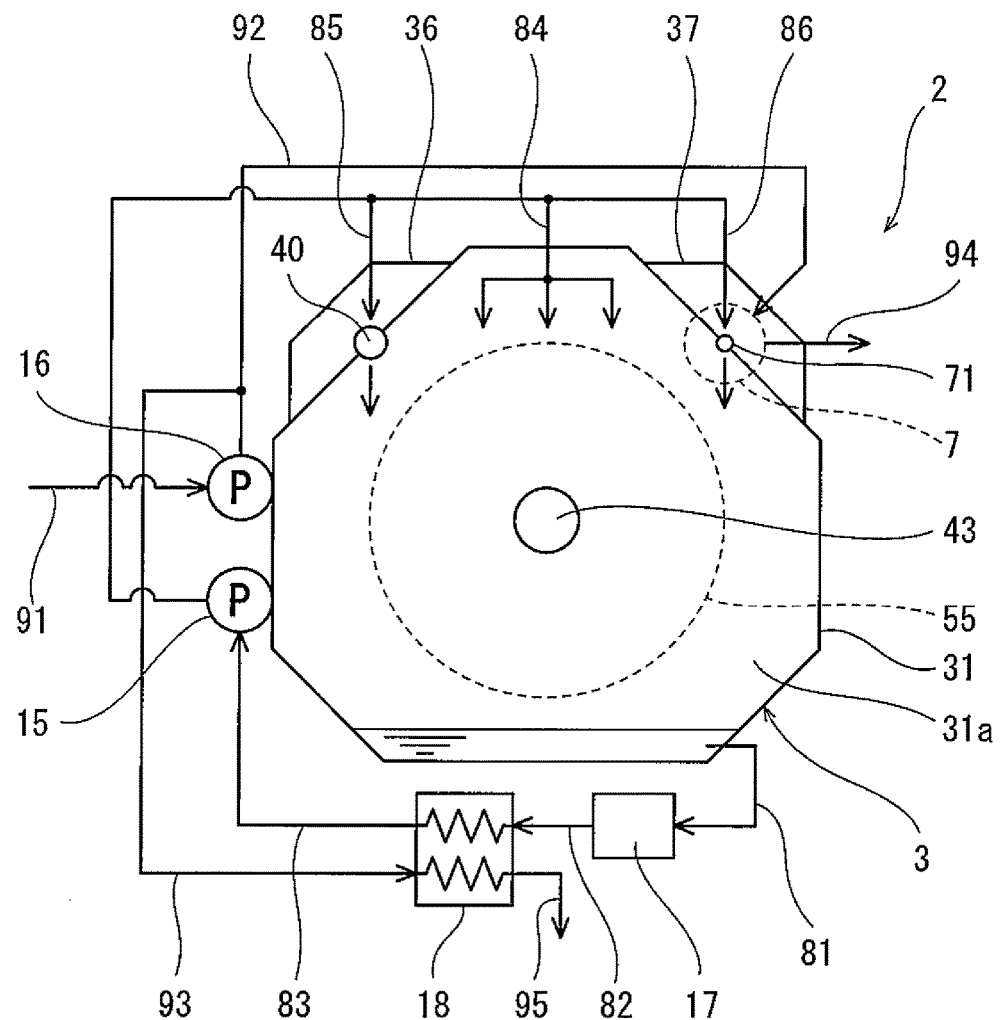
FIG. 2 is a front view of the marine reduction gear of FIG. 1.

FIG. 1 and FIG. 2 show a marine reduction gear 2 according to one embodiment of the present invention. The marine reduction gear 2 is disposed in the engine room of a ship together with an engine 11.

Specifically, the marine reduction gear 2 includes: an input shaft 40 coupled to an output shaft 12 (first output shaft) of the engine 11; and an output shaft 43 (second output shaft) coupled to a propeller shaft 13, which rotates a screw propeller 14. Hereinafter, for the sake of convenience of the description, the propeller shaft 13 side of the output shaft 43 in its axial direction is referred to as rear or rearward, and the other side of the output shaft 43 in its axial direction is referred to as front or forward.

In the present embodiment, the engine 11 is disposed rearward of the marine reduction gear 2. However, as an alternative, the engine 11 may be disposed forward of the marine reduction gear 2. The engine 11 may be a gas turbine engine, or may be a 2-stroke or 4-stroke reciprocating engine.

An input gear 51 is provided on the input shaft 40, and an output gear 55 is provided on the output shaft 43. The input gear 51 and the output gear 55 may directly mesh with each other, or mesh with each other via (one or a plurality of) other gear(s). The input gear 51 and the output gear 55 are accommodated in a gearbox 3.

The input shaft 40 parallel to the output shaft 43 protrudes rearward from the gearbox 3, and is coupled to the output shaft 12 of the engine 11 by flange coupling. Similarly, the output shaft 43 protrudes rearward from the gearbox 3, and is coupled to the propeller shaft 13 by flange coupling.

In the present embodiment, the input shaft 40 is divided into: a front part 42, on which the input gear 51 is provided; and a rear part 41 penetrating the gearbox 3. The rear part 41 and the front part 42 of the input shaft 40 are coupled together via a clutch 21. However, as an alternative, the input shaft 40 may be a single integrated component, and outside the gearbox 3, the input shaft 40 may be coupled to the output shaft 12 of the engine 11 via the clutch 21.

The gearbox 3 supports a bearing 61 and bearing 62, the bearing 61 supporting the rear part 41 of the input shaft 40 in a rotatable manner, the bearings 62 supporting the front part 42 of the input shaft 40 in a rotatable manner. The gearbox 3 also supports bearings 63, which support the output shaft 43 in a rotatable manner (the bearings 63 correspond to a first bearing of the present invention).

In the present embodiment, an electrical rotating machine 7 is integrally incorporated in the gearbox 3, and a lubricating oil pump 15 and a coolant pump 16 are mounted to the gearbox 3.

The lubricating oil pump 15 and the coolant pump 16 are driven by the input shaft 40. To be more specific, the front part 42 of the input shaft 40 is provided with a driving gear 52, and the rotating shaft of the lubricating oil pump 15 and the rotating shaft of the coolant pump 16 are provided with a driven gear 53 and a driven gear 54, respectively. The driving gear 52 may directly mesh with the driven gears 53 and 54, or mesh with the driven gears 53 and 54 via (one or a plurality of) other gear(s). The driving gear 52 and the driven gears 53 and 54 are also accommodated in the gearbox 3. Functions of the lubricating oil pump 15 and the coolant pump 16 will be described below.

In the present embodiment, the electrical rotating machine 7 functions as a power generator and an electric motor. In a case where the electrical rotating machine 7 functions as a power generator, the clutch 21 is turned on (engaged). In a case where the electrical rotating machine 7 functions as an electric motor, when the clutch 21 is turned on, the electrical rotating machine 7 assists the output of the engine 11, and when the clutch 21 is turned off (disengaged), the screw propeller 14 is rotated solely by the electrical rotating machine 7. Alternatively, the electrical rotating machine 7 may function only as a power generator, or may function only as an electric motor. It should be noted that a clutch 22 described below is turned on (engaged) both when the electrical rotating machine 7 functions as a power generator and when the electrical rotating machine 7 functions as an electric motor.

The electrical rotating machine 7 includes: a central shaft 71, which rotates together with the output shaft 43 and which extends in the front-rear direction; a rotor 72 fixed to the central shaft 71; and a stator 73 surrounding the rotor 72. In the present embodiment, between the central shaft 71 and the output shaft 43, first and second relay shafts 44 and 45 parallel thereto are provided. The second relay shaft 45 is disposed forward of the central shaft 71, and the first relay shaft 44 is disposed lateral to the central shaft 71 of the electrical rotating machine 7 and the second relay shaft 45.

The first relay shaft 44 is provided with a first relay gear 56, which meshes with the output gear 55 directly or via (one or a plurality of) other gear(s), and a second relay gear 57, which is disposed forward of the first relay gear 56. The gearbox 3 supports bearings 64, which support the first relay shaft 44 in a rotatable manner.

The second relay shaft 45 is provided with an input/output gear 58, which meshes with the second relay gear 57 directly or via (one or a plurality of) other gear(s). The second relay shaft 45 is coupled to the central shaft 71 of the electrical rotating machine 7 via the clutch 22. When a failure has occurred in the electrical rotating machine 7, the clutch 22 is turned off (disengaged) in order to prevent the output shaft 43 from becoming non-rotatable due to the failure of the electrical rotating machine 7. It should be noted that in the case of rotating the screw propeller 14 by only using the engine 11, the clutch 22 may be turned off to put the electrical rotating machine 7 in a stopped state in order to reduce mechanical loss caused by the electrical rotating machine 7.

Alternatively, the second relay shaft 45 may be disposed rearward of the electrical rotating machine 7. Further alternatively, the first relay shaft 44, the second relay shaft 45, and the clutch 22 may be eliminated, and the input/output gear 58 may be provided on the central shaft 71 of the electrical rotating machine 7, such that the input/output gear 58 meshes with the output gear 55 directly or via (one or a plurality of) other gear(s).

The gearbox 3 supports bearings 65, which support the central shaft 71 of the electrical rotating machine 7 in a rotatable manner (the bearings 65 correspond to a second bearing of the present invention). The gearbox 3 also supports the stator 73 of the electrical rotating machine 7.

As shown in FIG. 2, the gearbox 3 includes: a main structural body 31, in which the output gear 55 is disposed; and a first cover 36 and a second cover 37, each of which forms an enclosed space together with the main structural body 31. The input gear 51 is disposed in the enclosed space formed by the first cover 36 and the main structural body 31, and the electrical rotating machine 7 and the input/output gear 58 are disposed in the space formed by the second cover 37 and the main structural body 31.

The main structural body 31 includes a rear wall 31a and a front wall 31b, which are parallel to each other (see FIG. 1). The output shaft 43 penetrates the rear wall 31a and the front wall 31b. The bearings 63, which support the output shaft 43 in a rotatable manner, are supported by the rear wall 31a and the front wall 31b via unshown bearing pedestals mounted to the rear and front walls 31a and 31b.

Figure 3:
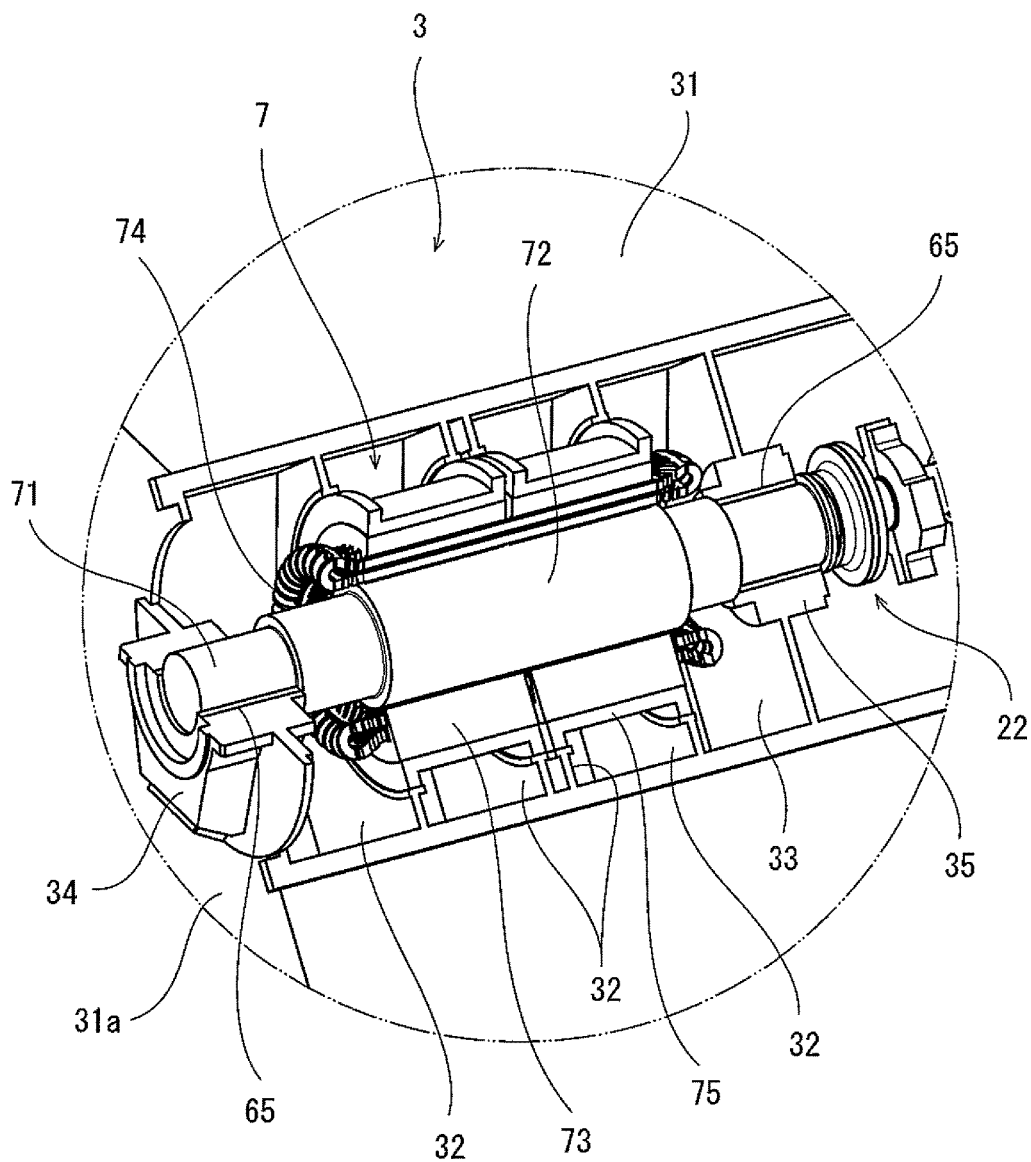
FIG. 3 is a sectional perspective view showing an electrical rotating machine.

In the present embodiment, as shown in FIG. 3, the bearing 65 supporting the rear end of the central shaft 71 of the electrical rotating machine 7 in a rotatable manner is supported by the rear wall 31a of the main structural body 31 and the second cover 37 via a bearing pedestal half body 34 mounted to the rear wall 31a and a bearing pedestal half body 34 mounted to the second cover 37 (the bearing pedestal half body 34 of the second cover 37 is not shown). It should be noted that FIG. 3 is a sectional perspective view showing the electrical rotating machine 7 in a state where the second cover 37 is removed.

In the main structural body 31, a partition wall 33 is provided at a position corresponding to the front end of the central shaft 71 of the electrical rotating machine 7. A bearing pedestal half body 35 is integrally formed on the partition wall 33. Similarly, a bearing pedestal half body 35 is integrally formed on the second cover 37 (the bearing pedestal half body 35 of the second cover 37 is not shown). The bearing 65 supporting the front end of the central shaft 71 of the electrical rotating machine 7 in a rotatable manner is supported by the partition wall 33 and the second cover 37 via these bearing pedestal half bodies 35.

In the present embodiment, a permanent magnet is incorporated in the rotor 72 of the electrical rotating machine 7, and a coil 74 is incorporated in the stator 73. However, the configuration of the electrical rotating machine 7 is not thus limited. Alternatively, the coil 74 may be incorporated in the rotor 72, and the permanent magnet may be incorporated in the stator 73. Further, in the present embodiment, the stator 73 is covered by a jacket 75. A passage through which a coolant flows is formed inside the jacket 75 or between the jacket 75 and the stator 73. The passage will be described below. The main structural body 31 and the second cover 37 are provided with a plurality of partition walls 32, which support the stator 73 of the electrical rotating machine 7 via the jacket 75 (the partition walls 32 of the second cover 37 are not shown).

Returning to FIG. 2, the aforementioned lubricating oil pump 15 circulates the lubricating oil, such that the lubricating oil flows downward in the gearbox 3. The lubricating oil pump 15 supplies the lubricating oil not only to the bearings 61 to 64 intended for the input shaft 40, the output shaft 43, and the first relay shaft 44, but also to the bearings 65 intended for the central shaft 71 of the electrical rotating machine 7.

To be more specific, the bottom of the main structural body 31 of the gearbox 3 is connected to the suction port of the lubricating oil pump 15 via a collection line 81, a lubricating oil tank 17, a first suction line 82, a heat exchanger 18, and a second suction line 83. The lubricating oil that flows downward in the gearbox 3 is received by the bottom of the main structural body 31, and is introduced into the lubricating oil tank 17 through the collection line 81. The lubricating oil stored in the lubricating oil tank 17 is led to the heat exchanger 18 through the first suction line 82. After the lubricating oil is cooled in the heat exchanger 18, the lubricating oil is sucked into the lubricating oil pump 15 through the second suction line 83.

A main discharge line 84 extends from the discharge port of the lubricating oil pump 15 toward various gears. A first branch line 85 and a second branch line 86 branch off from the main discharge line 84. The first branch line 85 is connected to the bearings 61 to 64, and the second branch line 86 is connected to the bearings 65. The lubricating oil discharged from the lubricating oil pump 15 is supplied to the various gears through the main discharge line 84, and also, supplied to the bearings 61 to 65 through the first branch line 85 and the second branch line 86. The lubricating oil supplied to the bearings 61 to 65 is ejected from the bearings 61 to 65 into the main structural body 31 of the gearbox 3.

A coolant is led from the outside of the engine room to the coolant pump 16 through an introduction line 91. The coolant is, for example, seawater. The coolant pump 16 supplies the coolant to the electrical rotating machine 7 (to be exact, to the aforementioned passage formed inside the jacket 75 or between the jacket 75 and the stator 73) through a first coolant supply line 92, and supplies the coolant to the heat exchanger 18 through a second coolant supply line 93. An upstream portion of the first coolant supply line 92 and an upstream portion of the second coolant supply line 93 form a single shared passage.

The heat exchanger 18 cools the lubricating oil that is to be sucked into the lubricating oil pump 15 by exchanging heat between the coolant flowing into the heat exchanger 18 from the second coolant supply line 93 and the lubricating oil flowing into the heat exchanger 18 from the first suction line 82. The coolant flowing out of the heat exchanger 18 is released to the outside of the engine room through a release line 95. Alternatively, the heat exchanger 18 may be disposed downstream of the lubricating oil pump 15, and the lubricating oil that has been discharged from the lubricating oil pump 15 may be cooled by the heat exchanger 18.

The coolant is supplied to the electrical rotating machine 7, such that the coolant flows in contact with the stator 73. In a case where the aforementioned passage is formed inside the jacket 75, the coolant contacts with the stator 73 indirectly via the partition walls, which are part of the jacket 75. On the other hand, in a case where the aforementioned passage is formed between the jacket 75 and the stator 73, the coolant directly contacts with the stator 73. The coolant supplied to the electrical rotating machine 7 is released to the outside of the engine room through the release line 95.

As described above, in the marine reduction gear 2 of the present embodiment, the electrical rotating machine 7 is integrally incorporated in the gearbox 3. This makes it possible to reduce the installation space of the electrical rotating machine 7. In addition, since the gearbox 3 doubles as the casing of the electrical rotating machine 7, the weight of the entire system including the gear reduction mechanism (the gearbox 3 and the gear train accommodated therein) and the electrical rotating machine 7 can be reduced.

The electrical rotating machine 7 can be made compact by setting its rated rotational speed high, even in a case where the electrical rotating machine 7 is a high-power machine. Such a compact electrical rotating machine 7 can be readily integrated with the gearbox 3.

Since the electrical rotating machine 7 is integrated with the gearbox 3, the input/output gear 58 can be disposed closely to the electrical rotating machine 7. Therefore, as compared to a conventional configuration in which the electrical rotating machine is coupled to the reduction gear by, for example, flange coupling, the distance between the electrical rotating machine 7 and the input/output gear 58 can be reduced, which makes it possible to suppress the occurrence of vibration of the central shaft 71 of the electrical rotating machine 7.

In the present embodiment, the lubricating oil can be supplied to the bearings 65 intended for the central shaft 71 of the electrical rotating machine 7 by utilizing the lubricating oil pump 15, which supplies the lubricating oil to the gears in the gearbox 3. In addition, the lubricating oil supplied to the bearings 65 is ejected from the bearings 65 into the main structural body 31 of the gearbox 3. Thus, the bottom of the main structural body 31 can be utilized as a lubricating oil receiver that is shared by the gears and the electrical rotating machine 7.

In the present embodiment, the coolant is supplied from the coolant pump 16 to the electrical rotating machine 7. Accordingly, the electrical rotating machine 7 can be made more compact than in a case where the electrical rotating machine 7 is cooled by air applied thereto. Moreover, the coolant pump 16 can be driven by using the output from the engine 11 or from the electrical rotating machine 7, the output being distributed in the gearbox 3.

Furthermore, since the coolant pump 16 supplies the coolant also to the heat exchanger 18, both the cooling of the electrical rotating machine 7 and the cooling of the lubricating oil can be performed by using the single coolant pump 16.

(Variations)

The present invention is not limited to the above-described embodiment. Various modifications can be made without departing from the spirit of the present invention.

For example, it is not necessary that one of or both the lubricating oil pump 15 and the coolant pump 16 be mounted to the marine reduction gear 2. Alternatively, one of or both the lubricating oil pump 15 and the coolant pump 16 may be installed separately from the marine reduction gear 2. The second coolant supply line 93 may be eliminated, and the heat exchanger 18 may cool the lubricating oil by exchanging heat between the lubricating oil and air.

It is not necessary that the coolant be used for cooling the electrical rotating machine 7. For example, if the temperature of the lubricating oil is suitable for cooling the electrical rotating machine 7, the lubricating oil may be supplied to the electrical rotating machine 7 by the lubricating oil pump 15, and the electrical rotating machine 7 may be cooled by using the lubricating oil.

The number of electrical rotating machines 7 integrally incorporated in the gearbox 3 may be one, or more than one.

REFERENCE SIGNS LIST

11 engine
13 propeller shaft
15 lubricating oil pump
16 coolant pump
18 heat exchanger
2 marine reduction gear
3 gearbox
40 input shaft
43 output shaft
51 input gear
55 output gear
61 to 65 bearing
7 electrical rotating machine
71 central shaft
72 rotor
73 stator
92 first coolant supply line
93 second coolant supply line

The invention claimed is:

1. A marine reduction gear comprising:
an input shaft coupled to a first output shaft that is an output shaft of an engine;
a second output shaft coupled to a propeller shaft that rotates a screw propeller;
a gearbox accommodating an input gear provided on the input shaft and an output gear provided on the second output shaft, the gearbox supporting a first bearing that supports the second output shaft in a rotatable manner; and
an electrical rotating machine including:
a central shaft that rotates together with the second output shaft;
a rotor fixed to the central shaft; and
a stator surrounding the rotor, wherein
the gearbox supports the stator and a pair of second bearings that supports the central shaft of the electrical rotating machine at both sides of the rotor in a rotatable manner.

2. The marine reduction gear according to claim 1, further comprising a lubricating oil pump mounted to the gearbox and driven by the input shaft, wherein
the lubricating oil pump circulates lubricating oil such that the lubricating oil flows downward in the gearbox, and supplies the lubricating oil to the pair of second bearings, and
the lubricating oil supplied to the pair of second bearings is ejected from the pair of second bearings into the gearbox.

3. The marine reduction gear according to claim 1, further comprising a coolant pump mounted to the gearbox and driven by the input shaft, wherein
the coolant pump supplies a coolant to the electrical rotating machine, such that the coolant flows in contact with the stator of the electrical rotating machine.

4. The marine reduction gear according to claim 3, wherein
the coolant pump supplies the coolant to the electrical rotating machine through a first coolant supply line, and supplies the coolant to a heat exchanger through a second coolant supply line, and
the heat exchanger cools a lubricating oil by exchanging heat between the lubricating oil and the coolant, the lubricating oil being the lubricating oil that is to be sucked into a lubricating oil pump or the lubricating oil that has been discharged from the lubricating oil pump.

5. The marine reduction gear according to claim 2, further comprising a coolant pump mounted to the gearbox and driven by the input shaft, wherein
the coolant pump supplies a coolant to the electrical rotating machine, such that the coolant flows in contact with the stator of the electrical rotating machine.

6. The marine reduction gear according to claim 5, wherein
the coolant pump supplies the coolant to the electrical rotating machine through a first coolant supply line, and supplies the coolant to a heat exchanger through a second coolant supply line, and
the heat exchanger cools the lubricating oil by exchanging heat between the lubricating oil and the coolant, the lubricating oil being the lubricating oil that is to be sucked into the lubricating oil pump or the lubricating oil that has been discharged from the lubricating oil pump.

7. A marine reduction gear comprising:
an input shaft coupled to a first output shaft that is an output shaft of an engine;
a second output shaft coupled to a propeller shaft that rotates a screw propeller;
a gearbox accommodating an input gear provided on the input shaft and an output gear provided on the second output shaft, the gearbox supporting a first bearing that supports the second output shaft in a rotatable manner;
an electrical rotating machine including:
a central shaft that rotates together with the second output shaft;
a rotor fixed to the central shaft; and
a stator surrounding the rotor; and
a lubricating oil pump mounted to the gearbox and driven by the input shaft; and
a coolant pump mounted to the gearbox and driven by the input shaft, wherein
the gearbox supports the stator and a second bearing that supports the central shaft of the electrical rotating machine in a rotatable manner, the lubricating oil pump circulates lubricating oil such that the lubricating oil flows downward in the gearbox, and supplies the lubricating oil to the second bearing, the lubricating oil supplied to the second bearing is ejected from the second bearing into the gearbox, the coolant pump supplies a coolant to the electrical rotating machine, such that the coolant flows in contact with the stator of the electrical rotating machine, the coolant pump supplies the coolant to the electrical rotating machine through a first coolant supply line, and supplies the coolant to a heat exchanger through a second coolant supply line, and the heat exchanger cools the lubricating oil by exchanging heat between the lubricating oil and the coolant, the lubricating oil being the lubricating oil that is to be sucked into the lubricating oil pump or the lubricating oil that has been discharged from the lubricating oil pump.

* * * * *